3,060,134
PHOTOCONDUCTIVE ZINC OXIDE PIGMENT
James Tait Elder and Carl Richard Bieling, Palmerton, and A Eugene Blakeslee, Bethlehem, Pa., assignors to The New Jersey Zinc Company, New York, N.Y., a corporation of New Jersey
No Drawing. Filed Mar. 3, 1959, Ser. No. 796,759
17 Claims. (Cl. 252—501)

This invention relates to photoconductive pigments and, more particularly, to photoconductive zinc oxide pigments having exceptionally desirable properties for electrostatic photography.

High purity zinc oxide, such as commercial grade French process zinc oxide pigment, possesses the characteristic of being capable of accepting and holding a negative electrostatic charge which is discharged when the pigment is exposed to ultra-violet or deep blue light. The pigment is relatively insensitive to discharge by the other components of visible light and does not accept a positive electrostatic charge.

Use is made of this photoconductive characteristic of high purity zinc oxide for electrostatic printing purposes by incorporating the zinc oxide in a resinous binder and applying it as a coating on paper, then charging the zinc oxide in the coating with a negative corona, exposing the thus-charged coating to an image illuminated by an incandescent light so that the charge on the lighted areas can be discharged, and then applying a positively charged color-contrasting resinous "toner" powder to the resulting coated surface so that the powder is retained by the portions of the surface which still retain a negative charge. The result is a positive-to-positive print of the original image. It is also possible to make reversed prints (negatives-to-positives) when a negatively charged toner powder is used with a negatively charged surface. However, the reversal effect is a delicate one in practice, and it works best with subject matter which involves no extended uncharged areas.

In positive-to-positive electrostatic printing, the initial apparent surface voltage of the zinc oxide, or its "accepted voltage." is significant inasmuch as some threshold value of accepted voltage must be attainable in order for the remaining charged areas of the zinc oxide surface to be able to hold the toner particles which form the visible image. Also of significance is the amount of light required to discharge the lighted areas of the image on the zinc oxide surface; the less the amount of light required for this purpose, the "faster" is its printing speed.

We have now discovered that a zinc oxide product panchromatically sensitive to light-discharge of an accepted electrostatic charge can be obtained by a combination of chemical and physical treatments. The chemical treatment involves the formation of a thin surface layer of zinc sulfide on the zinc oxide particles, and the physical treatment comprises a heat treatment which converts the sulfide-coated particles into a heterogeneous complex of zinc oxide and zinc sulfide.

Thus, the method of producing a panchromatically sensitive zinc oxide product pursuant to our invention comprises exposing particles of high purity zinc oxide pigment to a sufiding atmosphere under reaction conditions which will form only a thin layer of zinc sulfide on the zinc oxide particles, and thereafter heating the resulting zinc sulfide-coated zinc oxide particles to a temperature sufficiently high to convert the coated particles to a heterogeneous complex of zinc oxide and zinc sulfide. The resulting zinc oxide product is panchromatically photoconductive, that is, it is panchromatically sensitive to light-discharge of an accepted electrostatic charge.

The term "panchromatic sensitivity" signifies sensitivity to light of all colors, and normally this is construed to mean visible light only. Since printing speed measures the total effect of individual monochromatic sensitivities each weighted according to the corresponding monochromatic emission of the light source used for printing, an increase in panchromatic sensitivity will not of necessity produce an increased printing speed for every light source. However, because incandescent sources of light are selectively enriched in visible light of longer wavelengths, it is frequently the case with such sources that a shift of the region of high sensitivity from the ultra-violet or blue region to longer wavelengths results in an increase in printing speed, whether or not the original short wavelength sensitivity is retained. The material of our invention is characterized by sensitivity extending almost completely through the visible region of the spectrum. In some modifications the ultraviolet sensitivity is also retained, but the enhancement of printing speed has its origins in the panchromatic portion of its sensitivity. Variations noted in the panchromatic sensitivity among the various modifications of the material of our invention are variations only in the magnitude of the sensitivity and are not due to variations in the individual monochromatic sensitivities.

The zinc oxide which is amenable to conversion to panchromatic sensitivity pursuant to our invention is any zinc oxide pigment of high purity. French process zinc oxide of commerical grade, or better, is particularly suitable because of its purity and fine particle size. American process oxide may also be improved in panchromatic sensitivity by treatment pursuant to our invention.

Zinc oxide particle sizes ranging from about 0.15 to 0.5 micron are responsive to development of useful panchromatic sensitivity by the treatment of our invention. Within this range, the smaller particles tend to develop a more pronounced yellowish color than the larger particles, and for this reason we presently prefer to use a starting material having a particle size of about 0.4 micron.

The development of a thin uniform layer of zinc sulfide on the surfaces of the zinc oxide particles is obtained by controlled reaction between the zinzc oxide and a sulfiding atmosphere. Hydrogen sulfide is particularly effective as the sulfiding atmosphere although other sulfur-containing and readily-volatilizable compounds such as carbon disulfide, and the like, are effective. Solutions of sodium monosulfide and of ammonium monosulfide are also effective sulfiding environments. In order to facilitate control of the vapor phase sulfiding reaction, we have found it advantageous to dilute the sulfiding medium to at least half-strength with an inert gas such as nitrogen or air. For example, a sulfide atmosphere composed of from about 1% to about 50% by weight of dry, commercial grade, hydrogen sulfide and the balance nitrogen is not only highly effective but can be readily controlled by choice of reaction temperatures within the range of about 30° to about 160° C. to form a proper amount of zinc sulfide on the surface of the zinc oxide particles. With a given concentration of hydrogen sulfide and given reaction temperature, the sulfur content of the pigment (i.e. the amount of zinc sulfide formed on the surface of the zinc oxide) rapidly reaches a specific saturation level. Prolonged treatment has little effect on increasing the sulfur content. However, increasing either the temperature, the humidity or the hydrogen sulfide concentration causes higher amounts of sulfur to be introduced.

Effective amounts of zinc sulfide appear at present to be those amounts which form an initial zinc sulfide layer about 10 to about 25 A. thick on the surfaces of the zinc oxide particles. Within this range, zinc sulfide layers about 11.4 to about 18 A. thick impart optimum printing speed to the finished product, while zinc sulfide layers of increasing thickness up to about 22 A. progressively decrease the sensitivity of the final product to a level about twice that of the untreated zinc oxide. It must be understood at this point that throughout the specification and claims the properties ascribed to the zinc oxide product are actually those determined on the pigment incorporated in a conventional resin binder in the manner customary for electrostatic photography and using incandescent white light for illumination.

The complexing or interaction of the zinc sulfide layer with the underlying zinc oxide is effected by a firing treatment at temperatures within the range of about 250° to about 450° C. The zinc oxide products obtained by firing within this range are characterized by a greater printing speed than untreated zinc oxide, but when the firing temperature is as low as about 200° C. or as high as about 550° C. the printing speed of the fired product is not significantly different than that of the untreated zinc oxide. Thus, firing under conditions such as to raise the temperature of the mass of zinc sulfide-coated zinc oxide pigment particles to a temperature within the range of about 250° to about 450° C. is sufficient to convert the coated pigment to a zinc oxide-zinc sulfide complex characterized by panchromatic sensitivity of useful magnitude. When fired in bulk form, as in a vertical column or horizontal kiln, the heating period at temperature must be of sufficient duration to bring all of the material up to temperature and thereby convert all of the material to the desired heterogeneous complex, and prolonged heating for as much as 15 hours has no significant further effect on its panchromatic sensitivity.

The physical composition of the fired product has thus far defied specific identification. Both zinc oxide and zinc sulfide are white; the color of the fired products of our invention is ivory, the depth of the ivory-yellow cast being greater for higher sulfur contents. It appears, accordingly, that the surface of the fired pigments is not composed of either zinc oxide or zinc sulfide. Inasmuch as the sulfur content of the fired product is substantially the same as the pre-fired product, it is apparent that the zinc sulfide layer has not been volatilized so as to leave a sulfide-free zinc oxide surface, and the yellowish color of the fired product precludes the possibility that it consists merely of a zinc sulfide coating on a zinc oxide core. Electron diffraction analysis shows the existence of zinc oxide and zinc sulfide lines. On the basis of such evidence, as well as the difference between normal zinc oxide and the zinc oxide product of our invention with respect to such surface phenomena as color and electrostatic discharge sensitivity, we are led to the conclusion that the particles of the new product are heterogeneous with the core composed of substantially pure crystalline zinc oxide and with an adjoining surface layer of some complex of zinc oxide and zinc sulfide. Thus, the overall product comprises a heterogeneous complex of zinc oxide and zinc sulfide.

The following specific example is illustrative of the practice of the invention:

*Example 1*

Sixty grams of French process zinc oxide of a particle size of 0.42 micron diameter were charged into a ⅞ inch diameter vertical tube. Nitrogen, at a rate of 139 cc. per minute, was passed upward through the zinc oxide charge at room temperature. To the nitrogen stream was added 1.66 cc. per minute of dry commercial grade hydrogen sulfide so as to form a treating gas atmosphere containing 1.1% hydrogen sulfide by volume. Treatment was continued at ambient temperature for a period of about 115 minutes until all of the oxide had been converted from white to an off-white color. The treated oxide, bearing a zinc sulfide surface layer about 13 A. thick and corresponding to a sulfur content of about 0.45%, was then transferred from the tube to a boat and was fired in an externally heated tube furnace for one hour at 400° C. in an inert atmosphere of nitrogen.

The fired product retained its off-white ivory color after cooling to room temperature and contained, by chemical analysis, 0.45% sulfide-sulfur. Its sensitivity to discharge of a negative electrostatic charge by exposure to incandescent white light, as determined by the conventional photographic step tablet procedure for measuring printing speed, was approximately four times that of the same French process zinc oxide without treatment.

The same treating procedure was repeated varying the hydrogen sulfide flow from 1.60 to 3.5 cc. per minute (corresponding to sulfiding atmospheres containing from 1.1 to 2.5% by volume of hydrogen sulfide) so as to vary the sulfur content of the fired product from 0.45 to 0.65% and corresponding to pre-fired zinc sulfide layers ranging from about 13 to about 18 A. thick. All of these fired products had approximately four times the sensitivity or speed of the untreated zinc oxide. On the other hand, similar treatment resulting in sulfur contents below about 0.35% yielded products of undependable results, and treatments which produced increasing sulfur contents ranging from about 0.65 to about 1.0% (the latter corresponding to a pre-fired zinc sulfide layer about 28–30 A. thick) yielded products exhibiting decreasing sensitivity or speed to incandescent light, the product containing about 0.8% sulfur (a pre-fired zinc sulfide layer of about 22 A. thickness) having a speed about twice that of the untreated zinc oxide and the product containing about 1.0% sulfur having virtually the same speed as that of the untreated zinc oxide. Firing temperature variations between 350° and 450° C., and firing period times varying from one to 15 hours had no appreciable effect upon the printing speed of the product when charged by a negative corona.

Within the range of treating conditions which produce panchromatically sensitive zinc oxide pigment products whose accepted negative charges can be rapidly discharged by incandescent light, we have found that a more limited range of these treating conditions yields products which are also capable of accepting a photosensitively dischargeable positive charge. That is, the products of this narrower range are bi-charging in adidtion to being panchromatically sensitive.

The bi-charging zinc oxide pigments of this invention are those initially prepared to have a zinc sulfide coating layer (before firing) about 18 to 22 A. thick. In the case of the aforementioned French process zinc oxide having a particle size of 0.42 micron diameter, this sulfide layer thickness corresponds to a sulfur content of about 0.62 to 0.8% in the fired product. Within this range, the maximum panchromatic sensitivity of the pigment corresponds to the sulfur content of 0.62%, and the sensitivity falls off with increasing sulfur content until at 0.8% sulfur its speed is double, and at about 1% sulfur is substantially the same as, that of the untreated zinc oxide. In this respect, then, the positive charge sensitivity and the negative charge sensitivity are substantially the same for varying pre-fired zinc sulfide layer thicknesses or post-fired sulfur contents. Below about 18 A. thickness, the zinc sulfide pre-firing layer does not impart sufficient positive charge acceptance to the fired pigment to make it useful in a positive charge operation.

We have also found that the firing temperature also has an effect upon the positive charge sensitivity of the zinc oxide product of the invention. That is, a firing temperature of about 350° C. appears to produce optimum positive charge sensitivity in a pigment containing the optimum amount of sulfur for positive charge sensitivity. Temperatures 100° C. below and above this optimum value are about the limits of useful firing temperatures, and even at these limits the positive charge sensitivity of the fired product is markedly decreased, though nevertheless superior to the untreated zinc oxide.

The bi-charging feature of some of the pigments of our invention leads to the possibility of using the same toner powder and pigment for either direct or reversal electrostatic photography, the corona polarity which is chosen dictating which kind of printing is accomplished. This unique feature is desirable because the toner deposition assembly of large automatically operated electrostatic printers is generally cumbersome and difficult to interchange, and for some printing applications, such as microfilm enlargement, both direct and reversal photography are necessary for producing a black-on-white copy.

Selenium, used extensively in xerography, exhibits the same bi-charge property and a considerably higher speed than the pigments of our invention, but its black color, toxicity and cost render selenium unsuitable for electrostatic printing wherein the photoconductor is part of the finished print. Certain cadmium sulfide products also show bi-charging and high speed, but the rapid decay of their accepted electrostatic charge in darkness leads to unsuitability for most applications in electrophotography. A panchromatically sensitive zinc oxide is described in United States Patents Nos. 2,727,807 and 2,727,808, but ilke the previously mentioned materials, it is strongly colored. One common white material, zinc sulfide, shows the bi-charging property and slow dark decay, but it has a considerably lower photographic speed than zinc oxide. Thus the pigment of this invention is unique in its combination of properties: slow dark decay, relatively high speed, bi-charging, and absence of strong coloration.

The following example is illustrative of the preparation of a bi-charging zinc oxide pigment according to our invention.

*Example II*

Sixty grams of the zinc oxide used in Example I were charged into the same ⅞ inch diameter vertical tube equipped with an external electric resistance winding to insure the uniform heating of the charge. Nitrogen at a rate of 139 cc. per minute was passed upward through the column of zinc oxide which was heated to 90° C. To the stream of nitrogen was added 2.3% dry commercial grade hydrogen sulfide. This treatment was continued for about 85 minutes after which the pigment was transferred to a boat and was fired at 350° C. in a nitrogen atmosphere for 1 hour. The resulting pigment contained by analysis 0.62% sulfur. It exhibited an accepted negative voltage of nearly 1100 volts and an accepted positive voltage of about 400 volts. Its printing speed when either the negative or positive accepted charge was discharged by exposing the pigment to incandescent light was approximately five times the corresponding speed of the untreated zinc oxide.

We claim:

1. A zinc oxide product panchromatically sensitive to light-discharge of an accepted electrostatic charge and consisting essentially of a high purity zinc oxide pigment the particles of which bear on their surfaces the product of heating in an inert atmosphere at a temperature of about 250°–450° C. the zinc oxide particles coated with a thin layer of zinc sulfide.

2. A zinc oxide product panchromatically sensitive to light-discharge of an accepted electrostatic charge and consisting essentially of a high purity zinc oxide pigment the particles of which bear on their surfaces the product of heating in an inert atmosphere at a temperature of about 250°–450° C. the zinc oxide particles coated with a layer of zinc sulfide about 10 to 25 A. thick.

3. A zinc oxide product panchromatically sensitive to light-discharge of an accepted electrostatic charge and consisting essentially of a high purity zinc oxide pigment the particles of which have a size of about 0.15 to 0.5 micron and bear on their surfaces the product of heating in an inert atmosphere at a temperature of about 250°–450° C. the zinc oxide particles coated with a layer of zinc sulfide about 10 to 25 A. thick.

4. A zinc oxide product panchromatically sensitive to light-discharge of an accepted electrostatic charge and consisting essentially of a high purity zinc oxide pigment the particles of which bear on their surfaces the product of heating in an inert atmosphere at a temperature of about 250°–450° C. the zinc oxide particles coated with a layer of zinc sulfide about 11 to 17 A. thick.

5. A zinc oxide product panchromatically sensitive to light-discharge of an accepted electrostatic charge and consisting essentially of a high purity zinc oxide pigment the particles of which have a size of about 0.15 to 0.5 micron and bear on their surfaces the product of heating in an inert atmosphere at a temperature of about 250°–450° C. the zinc oxide particles coated with a layer of zinc sulfide about 11 to 17 A. thick.

6. A zinc oxide product panchromatically sensitive to light-discharge of an accepted electrostatic charge and consisting essentially of a high purity zinc oxide pigment the particles of which have a size of about 0.4 micron and bear on their surfaces the product of heating in an inert atmosphere at a temperature of about 250°–450° C. the zinc oxide particles coated with a layer of zinc sulfide about 11 to 17 A. thick.

7. A bi-charging zinc oxide product panchromatically sensitive to light-discharge of an accepted electrostatic charge and consisting essentially of a high purity zinc oxide pigment the particles of which bear on their surfaces the product of heating in an inert atmosphere at a temperature of about 250°–450° C. the zinc oxide particles coated with a layer of zinc sulfide about 18 to 22 A. thick.

8. A bi-charging zinc oxide product panchromatically sensitive to light-discharge of an accepted electrostatic charge and consisting essentially of a high purity zinc oxide pigment the particles of which have a size of about 0.15 to 0.5 micron and bear on their surfaces the product of heating in an inert atmosphere at a temperature of about 250°–450° C. the zinc oxide particles coated with a layer of zinc sulfide about 18 to 22 A. thick.

9. A bi-charging zinc oxide product panchromatically sensitive to light-discharge of an accepted electrostatic charge and consisting essentially of a high purity zinc oxide pigment the particles of which have a size of about 0.4 micron and bear on their surfaces the product of heating in an inert atmosphere at a temperature of about 250°–450° C. the zinc oxide particles coated with a layer of zinc sulfide about 18 to 22 A. thick.

10. The method of producing a zinc oxide product panchromatically sensitive to light-discharge of an accepted electrostatic charge which comprises exposing particles of high purity zinc oxide pigment to a sulfiding environment under reaction conditions which will form only a thin layer of zinc sulfide on the zinc oxide particles, and thereafter heating the resulting zinc sulfide-coated zinc oxide particles in an inert atmosphere to a temperature within the range of about 250° to 450° C. to convert the coating to a complex of zinc oxide and zinc sulfide.

11. The method of producing a zinc oxide product panchromatically sensitive to light-discharge of an accepted electrostatic charge which comprises exposing particles of high purity zinc oxide pigment to a sulfiding environment under reaction conditions which will form a layer of zinc sulfide about 10 to 25 A. thick on the zinc oxide particles, and thereafter heating the resulting zinc sulfide-coated zinc oxide particles in an inert atmosphere to a temperature within the range of about 250° to 450° C. to convert the coating to a complex of zinc oxide and zinc sulfide.

12. The method of producing a zinc oxide product panchromatically sensitive to light-discharge of an accepted electrostatic charge which comprises exposing particles of high purity zinc oxide pigment to a hydrogen sulfide atmosphere under reaction conditions which will form only a thin layer of zinc sulfide on the zinc oxide particles, and thereafter heating the resulting zinc sulfide-coated zinc oxide particles in an inert atmosphere to a temperature within the range of about 250° to 450° C. to convert the coating to a complex of zinc oxide and zinc sulfide.

13. The method of producing a zinc oxide product panchromatically sensitive to light-discharge of an accepted electrostatic charge which comprises exposing particles of high purity zinc oxide pigment to a sulfiding atmosphere under reaction conditions which will form only a thin layer of zinc sulfide on the zinc oxide particles, and thereafter heating the resulting zinc sulfide-coated zinc oxide particles in an inert atmosphere to a temperature within the range of about 250° to 450° C. to convert the coating to a complex of zinc oxide and zinc sulfide.

14. The method of producing a bi-charging zinc oxide product panchromatically sensitive to light-discharge of an accepted electrostatic charge which comprises exposing particles of high purity zinc oxide pigment to a sulfiding atmosphere under reaction conditions which will form a layer of zinc sulfide about 18 to 22 A. thick on the zinc oxide particles, and thereafter heating the resulting zinc sulfide-coated zinc oxide particles in an inert atmosphere to a temperature within the range of about 250° to 450° C. to convert the coating to a complex of zinc oxide and zinc sulfide.

15. The method of producing a zinc oxide product panchromatically sensitive to light-discharge of an accepted electrostatic charge which comprises exposing particles of high purity zinc oxide pigment to a sulfide sulfur-containing atmosphere at a temperature of about 30° to 160° C., and thereafter heating the resulting zinc sulfide-coated zinc oxide particles in an inert atmosphere to a temperature of about 250°–450° C.

16. The method of producing a zinc oxide product panchromatically sensitive to light-discharge of an accepted electrostatic charge which comprises exposing particles of high purity zinc oxide pigment to a hydrogen sulfide-containing atmosphere at a temperature of about 30° to 160° C., and thereafter heating the resulting zinc sulfide-coated zinc oxide particles in an inert atmosphere to a temperature of about 250°–450° C.

17. The method of producing a bi-charging zinc oxide product panchromatically sensitive to light-discharge of an accepted electrostatic charge which comprises exposing particles of high purity zinc oxide pigment at a temperature of about 30° to 160° C. to a sulfide sulfur-containing atmosphere of sufficient reactivity to form a zinc sulfide layer about 18 to 22 A. thick on the surface of the zinc oxide particles, and thereafter heating the resulting zinc sulfide-coated zinc oxide particles in an inert atmosphere to a temperature of about 350° C.

References Cited in the file of this patent

UNITED STATES PATENTS

| | | |
|---|---|---|
| 2,573,817 | Thomsen | Nov. 6, 1951 |
| 2,585,461 | Hirsch | Feb. 12, 1952 |
| 2,727,808 | Thomsen | Dec. 20, 1955 |
| 2,732,313 | Cusano et al. | Jan. 24, 1956 |
| 2,824,047 | Gorin et al. | Feb. 18, 1958 |